Patented Sept. 8, 1931

1,822,815

UNITED STATES PATENT OFFICE

THEODOR LICHTENBERGER AND LUDWIG KAISER, OF HEILBRONN-ON-THE-NECKAR, GERMANY

PROCESS FOR MANUFACTURING PURE, WHITE AND FINELY DISTRIBUTED SULPHATE OF BARIUM AND SULPHATE OF CALCIUM

No Drawing. Application filed March 22, 1927, Serial No. 177,472, and in Germany April 3, 1926.

The subject of the present invention is a process for producing pure, white and finely divided sulphate of barium and sulphate of calcium.

According to the present invention the raw materials, heavy spar, gypsum or anhydrite are dissolved in molten salts which, as chlorides of alkali metal, are fusible without decomposition and which in their molten state do not exert any decomposing effect upon sulphate of barium and sulphate of calcium, whereupon the insoluble substances are separated from the solution by settling and the molten mass is freed from the dissolved impurities by blowing air into said molten mass; the mass is clarified again and the purified sulphate is recovered by extracting the soluble salts by use of water.

The advantage of the process consists in producing a pure, white product of a chemically high grade and in avoiding thereby the expensive and tedious way over the sulphides of and chlorides of barium and calcium.

The process can for instance be carried out in the following manner:

15 parts sulphate of barium and 20 parts of sodium chloride are mixed and heated, the melting-point of this mixture not being beyond that of pure chloride of sodium.

Both crude materials are preferably employed in coarse lumps, thereby not only the very considerable cost of grinding is avoided, but likewise the very onerous dust.

As soon, as a thin liquid molten mass has been produced, the insoluble substances are separated by settling and the molten mass is drawn off to a second hearth on which a small quantity of oxide of calcium is added and air is blown into the molten mass.

The molten mass thereby becomes freed from the oxidizable part and such impurities, which can be decomposed by oxide of calcium and air, being either burned, or converted into combinations, which are insoluble in the molten mass.

If these impurities are allowed to settle, the pure molten mass does not contain impurities of any importance. It is granulated in water, or cooled rapidly in some other way and afterwards treated with water.

A pure white and finely divided sulphate of barium remains as a residue from the molten mass. This white sulphate of barium is in no way inferior to the blanc fixe precipitated from a solution of chloride of barium by sulphuric acid. Small quantities of sulphate of calcium contained in the molten mass are dissolved by the chloride of sodium. It is therefore possible to produce a high grade product directly from the crude materials, without the necessity of producing previously sulphide of barium and chloride of barium.

Instead of chlorides of alkali metal, other salts or mixtures of different salts may be employed, as long as they or the mixtures of salts can be melted without decomposition and exert no decomposing effect in molten condition upon sulphate of barium and sulphate of calcium.

Instead of air other gases or gas-mixtures containing oxygen can be employed.

Instead of oxide of calcium other additional substances may be used for instance silicic acid.

It is not necessary that the preliminary purification of the molten mass of chloride and barium sulphate or of the molten mass consisting of chloride of alkali metal and calcium sulphate is effected separately by settling and further treatment of the molten mass by air with or without the addition of basic or acid substances but particularly in the case of purer crude materials, both processes may be carried out simultaneously in one hearth.

We claim:

1. A process for manufacturing pure, white and finely divided sulphate of barium and sulphate of calcium consisting in dissolving the raw sulphates in molten chlorides of alkali metal, separating the insoluble substances from the solution by settling, freeing the molten mass from the dissolved impurities by blowing air into said molten mass, clarifying again and solidifying said mass and recovering the purified sulphate by extracting the soluble chlorides of alkali metal with water.

2. A process for manufacturing pure, white and finely divided sulphate of barium and sulphate of calcium consisting in dissolving the raw sulphates in molten chlorides of alkali-earth metal, separating the insoluble substances from the solution by settling, freeing the molten mass from the dissolved impurities by blowing air into said molten mass, clarifying again and solidifying said mass and recovering the purified sulphate by extracting the soluble chlorides of alkali-earth metal with water.

3. A process for manufacturing pure, white and finely divided sulphate of bariums and sulphate of calcium consisting in dissolving the raw sulphates in molten mixtures of chlorides of alkali metal and chlorides of alkali-earth metal, separating the insoluble substances from the solution by settling, freeing the molten mass from the dissolved impurities by blowing air into the molten mass, clarifying again and solidifying said mass and recovering the purified sulphate by extracting the soluble mixtures of chlorides of alkali metal and chlorides of alkali-earth metal with water.

4. A process for manufacturing pure, white and finely divided sulphate of barium and sulphate of calcium consisting in dissolving the raw sulphates in molten mixtures of chlorides of alkali-earth-metal and sulphates of alkali metal separating the insoluble substances from the solution by settling, freeing the molten mass from the dissolved impurities by blowing air into the molten mass, clarifying again and solidifying said mass and recovering the purified sulphate by extracting the soluble mixtures of chlorides of alkali-earth metal and sulphates of alkali metal with water.

5. A process for manufacturing pure, white and finely divided sulphate of barium and sulphate of calcium consisting in dissolving the raw sulphates in molten chlorides of alkali metal, separating the insoluble substances from the solution by settling, freeing the molten mass from the dissolved impurities by blowing air into said molten mass and adding oxide of calcium, clarifying again and solidifying said mass and recovering the purified sulphate by extracting the soluble chlorides of alkali metal with water.

6. A process for manufacturing pure, white and finely divided sulphate of barium and sulphate of calcium consisting in dissolving the raw sulphates in molten chlorides of alkali-earth metal separating the insoluble substances from the solution by settling, freeing the molten mass from the dissolved impurities by blowing air into said molten mass and adding oxide of calcium, clarifying again and solidifying said mass and recovering the purified sulphate by extracting the soluble chlorides of alkali-earth metal with water.

7. A process for manufacturing pure, white and finely divided sulphate of barium and sulphate of calcium consisting in dissolving the raw sulphates in molten mixtures of chlorides of alkali metal and chlorides of alkali-earth metal separating the insoluble substances from the solution by settling, freeing the molten mass from the dissolved impurities by blowing air into said molten mass and adding oxide of calcium, clarifying again and solidifying said mass and recovering the purified sulphate by extracting the soluble mixtures of chlorides of alkali metal and chlorides of alkali-earth metal with water.

8. A process for manufacturing pure, white and finely divided sulphate of barium and sulphate of calcium consisting in dissolving the raw sulphates in molten chlorides of alkali metal separating the insoluble substances from the solution by settling, freeing the molten mass from the dissolved impurities by blowing air into said molten mass, clarifying again and granulating said mass by passing it into water and recovering the purified sulphate by extracting the employed chlorides of alkali metal with water.

9. A process for manufacturing pure, white and finely divided sulphate of barium and sulphate of calcium consisting in dissolving the raw sulphates in molten chlorides of alkali-earth metal separating the insoluble substances from the solution by settling, freeing the molten mass from the dissolved impurities by blowing air into said molten mass, clarifying again and granulating said mass by passing it into water and recovering the purified sulphate by extracting the employed chlorides of alkali-earth metal with water.

10. A process for manufacturing pure, white and finely divided sulphate of barium and sulphate of calcium consisting in dissolving the raw sulphates in molten mixtures of chlorides of alkali metal and chlorides of alkai-earth metal separating the insoluble substances from the solution by settling, freeing the molten mass from the dissolved impurities by blowing air into said molten mass, clarifying again and granulating said mass by passing it into water and recovering the purified sulphate by extracting the employed mixtures of chlorides of alkali metal and chlorides of alkali-earth metal with water.

In testimony whereof we have affixed our signatures.

THEODOR LICHTENBERGER.
Dr. LUDWIG KAISER.